UNITED STATES PATENT OFFICE.

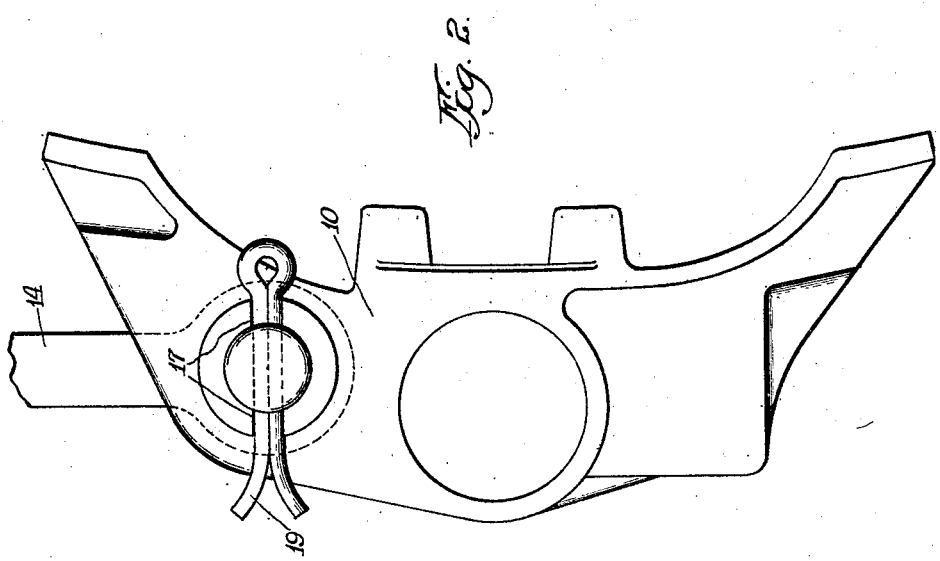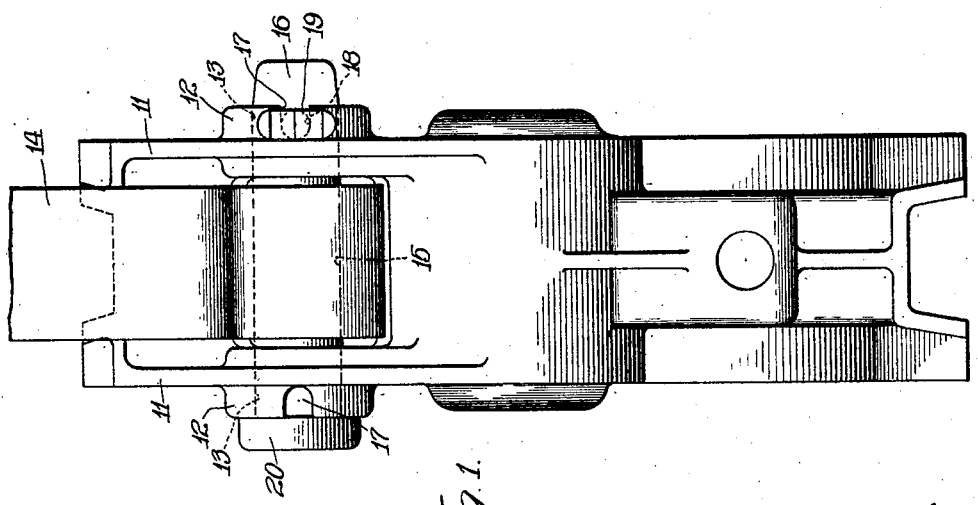

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-HEAD AND HANGER CONNECTION.

1,323,270.    Specification of Letters Patent.    Patented Dec. 2, 1919.

Application filed July 27, 1917. Serial No. 183,049.

*To all whom it may concern:*

Be it known that I, WILLIAM C. HEDGCOCK, a citizen of the United States, residing at Chicago, in the county of Cook and State of Illinois, have invented certain new and useful Improvements in Brake-Head and Hanger Connections, of which the following is a specification.

This invention relates to brake riggings and more particularly to means for connecting brake heads and their associated hangers.

One object of the invention is to make more durable and lasting the connection between brake heads and their hangers.

Another object is to connect brake heads and their hangers in a manner to meet the requirements for successful commercial operation.

These and other objects are accomplished by providing in combination a brake head having an opening, a hanger therefor having an opening, a pin extending through said openings to connect the brake head and hanger, and means for preventing movement of the pin.

The invention is illustrated on the accompanying sheet of drawings, in which—

Figure 1 is a rear elevation of a brake head and its hanger connected in accordance with my invention, and Fig. 2 is a side elevation of the same.

The various novel features of the invention will be apparent from the following description and drawings, and will be particularly pointed out in the appended claims.

I have disclosed my invention in connection with a brake head 10 having oppositely arranged webs 11 with bosses 12 provided with registering openings 13. A hanger 14 having an opening 15 which registers with the openings 13 in the bosses 12 of webs 11, is positioned intermediate the webs 11. For pivotally connecting the brake head 10 and hanger 14, a pin 16 extends through the registering openings of the same. Heretofore it has been the practice merely to drive the pin through the openings in the brake head and hangers, the pin merely being keyed to prevent accidental withdrawal. The connecting pins have been free to rotate and move otherwise, causing an abnormal amount of wear and occasioning considerable lost motion, thus requiring frequent renewal of pins and constant attention.

To overcome these disadvantages, I have provided means for holding the connecting pin in a given position, or in other words, for preventing movement of the pin. To this end each of the bosses 12 is provided with registering oppositely arranged slots or notches 17, either pair of notches being arranged to register with a transverse opening 18 in the pin 16, near one end thereof. A cotter pin or key 19 is inserted in the slots 17 and registering opening 18 in the connecting pin, thereby not only holding the pin in the head, but also preventing any turning or other movement of the pin. This results in minimizing wear of the pin. From an inspection of Fig. 1 of the drawings it will be appreciated that the pin 16 may be inserted from either side, which greatly facilitates applying and withdrawing the pin, and which is also most desirable to prevent the brake heads from being rights and lefts.

In this particular instance I have shown the pin as provided with but one opening at one end and having a head 20 at the other end. It is apparent that the head 20 may be dispensed with and if desired the pin may have an opening at both ends through which cotter keys may pass for the purpose of preventing movement of the pin.

It is apparent that there may be various modifications of the invention herein particularly shown and described and it is my intention to cover all such modifications which do not involve a departure from the spirit and scope of the invention as set forth in the following claims.

What I claim is:

1. In brake mechanism, the combination of a brake head having an opening and a slot, a hanger having an opening, a pin having an opening and extending through the openings in said brake head and hanger, and a key extending through said slot and pin opening for preventing movement of the pin.

2. In brake mechanism, the combination of a head having spaced webs with bosses having openings and slots therein, a hanger having an opening and being located between said webs, a pin extending through the openings in said webs and hanger to pivotally connect the brake head and hanger and having an opening registering with one of said slots, and a key extending into said pin opening and slot to prevent movement of the pin.

Signed at Chicago, Illinois, this 18th day of July, 1917.

WILLIAM C. HEDGCOCK.